United States Patent
Babiskin et al.

(10) Patent No.: US 6,931,411 B1
(45) Date of Patent: *Aug. 16, 2005

(54) VIRTUAL DATA LABELING SYSTEM AND METHOD

(75) Inventors: Robert Babiskin, Potomac, MD (US); Timothy C. Williams, Chantilly, VA (US)

(73) Assignee: Cryptek, Inc., Sterling, VA (US)

( * ) Notice: Subject to any disclaimer, the term of this patent is extended or adjusted under 35 U.S.C. 154(b) by 400 days.

This patent is subject to a terminal disclaimer.

(21) Appl. No.: 10/157,231

(22) Filed: May 30, 2002

Related U.S. Application Data (60) Provisional application No. 60/294,029, filed on May 30, 2001.

(51) Int. Cl.[7] .............................................. G06F 17/30
(52) U.S. Cl. ....................................... 707/100; 707/10
(58) Field of Search ............................ 707/3, 4, 9, 10, 707/100, 104.1, 2; 709/203

(56) References Cited

U.S. PATENT DOCUMENTS

| | | | | |
|---|---|---|---|---|
| 5,784,646 A | * | 7/1998 | Sawada | 710/38 |
| 5,864,870 A | * | 1/1999 | Guck | 707/104.1 |
| 6,681,382 B1 | * | 1/2004 | Kakumani et al. | 717/122 |

OTHER PUBLICATIONS

Hinrichs, S.; Policy-Based Management: Bridging the GAP, Computer Security Applications Conference, 1999. (ACSAC '99) IEEE Proceedings. Annual, Dec. 6-10, 1999, pp. 209-218.*

* cited by examiner

*Primary Examiner*—Greta Robinson
(74) *Attorney, Agent, or Firm*—Jacobson Holman PLLC (57) ABSTRACT

A mandatory access control system and method that employs virtual data labeling (VDL) on the communications channel to allow aspects about the data to determine by whom and where such data can be accessed. When combined with a secure network system, the VDL system is able to base delivery decisions not only on destination address but also on the type of data that is to be delivered.

15 Claims, 6 Drawing Sheets

FIG. 1
(PRIOR ART)

Standard DBMS Access Controls
* Commercial DBMSs as Oracle
* Access by Attribute to User or Role Data Base Management Systems

FIG. 2
(PRIOR ART)

Database Labels Access Controls
* Secure DBMSs as Trusted Oracle
  Access by Record Label
* Dynamic Label, e.g. Oracle Data Base Management System

FIG. 3

VDL Label Server
* Access by generated Label on the connection
* Commercial DBMSs

FIG. 6
System Diagram

FIG. 7
Systems Functions

FIG. 8
Policy Manager Detail

VIRTUAL DATA LABELING SYSTEM AND METHOD

CROSS-REFERENCE TO RELATED APPLICATIONS

This application claims the benefit of and priority from U.S. provisional application Ser. No. 60/294,029 filed May 30, 2001.

This application is related to an application filed on the same date as the present application and entitled "Virtual Data Labeling and Policy Manager System and Method".

BACKGROUND OF THE INVENTION

1. Field of the Invention

The present invention is related to the field of database management systems and, more particularly, to a system and method of implementing mandatory access control (MAC), as defined by the National Security Agency, through virtual data labeling.

2. Description of the Related Art

Figure 1:
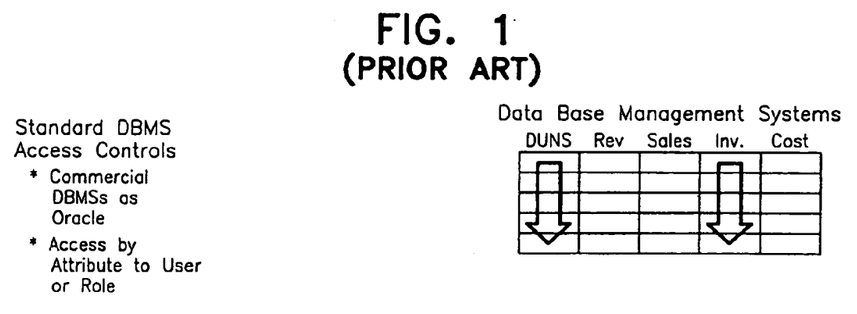
FIG. 1 is a graph of standard database management system access controls.

Access privileges on today's databases are protected by the database management system (DBMS) at the data element level. Data elements are typically arranged by column and are directed to categories such as cost, sales, inventory, etc. According to standard DBMS access controls, users authorized for a particular data element type can see all data within that data element type. For example, marketing users can access sales figures as a column, finance users can access cost data as a column, etc. This means that a user authorized to access a particular type of data can see every record within a column, including those records of competitors, as shown in FIG. 1.

There is a need in today's e-commerce and business-to-business markets for broader security access controls that are based on record categories. Records may be categorized by company name, contractual relationship, data sensitivity within the record, e.g., trade secret, etc. In addition, a need exists for privacy and a way of permitting users to access only their own records.

Unfortunately, most of today's data stores are not enabled to have fields that discriminate between rows based on user privileges. To provide a system, which is external to the DBMS, with the capability to discriminate based on row types, a toolkit is necessary which integrates legacy database information, current communications technology and the secure network system to deliver data to the appropriate users.

Figure 2:
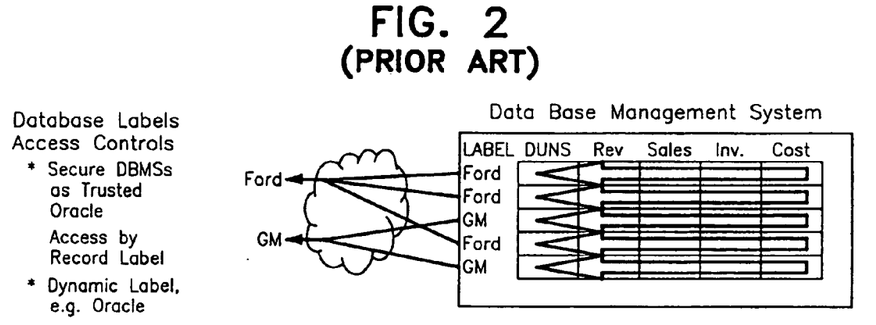
FIG. 2 is a graph of database labels access controls using trusted database management systems according to the prior art.

The two fundamental solutions today are application-specific coding and trusted facilities within the DBMS. Application-specific coding allows access at the type of record to be enforced, usually through what is called a "view" in DBMS and is applied on configurations such as that shown in FIG. 1. There is no securing facility is this approach or with applications using a File Management System (FMS). The second approach is to use 'trusted' DBMS's that support labeling (mandatory access control), or selected DBMS's that support dynamic labeling within the database which provide MAC-like DBMS enforcement within the access to the database. An example of the second approach is shown in FIG. 2. Both of these solutions are labor intensive and/or complex. The dynamic label approach requires no cataloging or programming, but uses the content of databases to virtually define, at the time of access, who can access the content. This decision making is accomplished by a policy that restricts access on the basis of data value.

SUMMARY OF THE INVENTION

Accordingly, it is an object of the present invention to provide a content-driven network access control mechanism.

Another object of the invention is to provide a system for use with a network that adds mandatory access control (MAC) data to communications dynamically and invisibly without application modification.

A further object of the invention is a system and method for providing virtual data labeling on the communications channel.

A still further object of the invention is to provide a system and method for dynamically labeling data records based on record categories.

Yet another object of the invention is to provide a record labeling system that is compatible with existing legacy database and file information, current communications technology and secure network systems.

In accordance with this and other objects, the present invention is directed to a virtual data labeling (VDL) system and method that allows aspects of the data to determine by whom and where that data may be accessed. The VDL system provides security mechanisms to differentiate between records (rows) of a database through a labeling process. VDL allows databases currently unlabeled by a DBMS or FMS products to be dynamically labeled external to the DBMS or FMS, on the communications channel, for each database or any data request call (DREQ). VDL works cooperatively with products that support the current IP standard's option header, supporting Common IP Security Option (CIPSO) labeling format (FIPS 188) for discriminating on the basis of the labels applied by the VDL system to enforce mandatory access controls security policy mechanisms. This VDL system creates a unified means of achieving security enforcement integrating across communications and database access.

The present invention enables the communications channel to enforce data access privileges which define who can see what record, based on a record label. For example, Ford sees only Ford records and GM sees only GM records (even though they are in the same database), and only from a designated location. VDL technology is incorporated on a label server and, based on transaction policy, i.e., what intrinsic fields in the database or files are to be used as the label, modifies the DREQ to incorporate the designated field for labeling and then labels the returned packets with the designated CIPSO label format and label value. The present invention is directed to the process of dynamic labeling on the communications channel, relying upon CISPO-based devices or another tagging mechanism to discriminate allowable traffic on the basis of the labels applied.

When combined with a FIPS-188-based network system, or other secure network, the present invention is capable of basing delivery decisions not only on destination address but also on the type of data that is to be delivered. For example, through use of the present invention suppliers may have access to a manufacturer's database but be privileged to only access their own rows of data. Once the network is instructed as to the type of data that is to be delivered, host systems instruct the network system regarding the type of data that is to be transferred by using standard operating system calls which provide the labeling of IP connections between host systems.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 3:
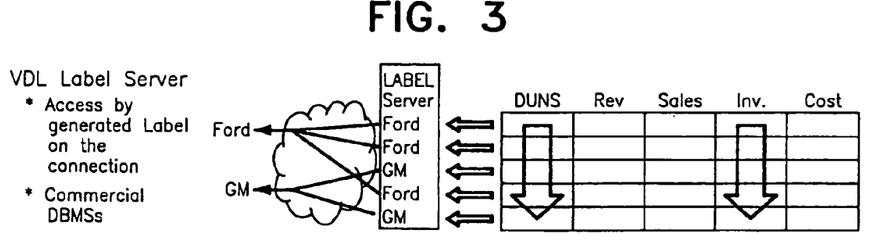
FIG. 3 is a graph of virtual data labeling on a label server in accordance with the present invention.

According to the present invention, VDL technology as deployed on a label server is seamlessly integrated with existing legacy database and file information, current communications technology such as TCP/IP or HTTP and a secure CISPO-based network system to provide a data-driven network access control mechanism as shown in FIG. 3, using trusted facilities external to the DBMS. VDL is implemented using current, commercially available server technology (label server), using a "trusted" building block approach for development of more secure networks in complement to cryptographic technology; high assurance policy-based enforcement (security policies) for protection of data; IPSecurity (IPSec) protocol including Encapsulated Security Payload (ESP) packet formats and Internet Key Exchange (IKE) protocol including ISAKAMP (Internet Security Association and Key Management Protocol) and Diffie-Hellman key exchange; Common IP Security Option (CIPSO) labeling format (FIPS 188); Data Encryption Standard (DES) and Triple DES (3DES) algorithms; and data integrity with SHA-1 (FIPS 180) MD5.

Figure 4:
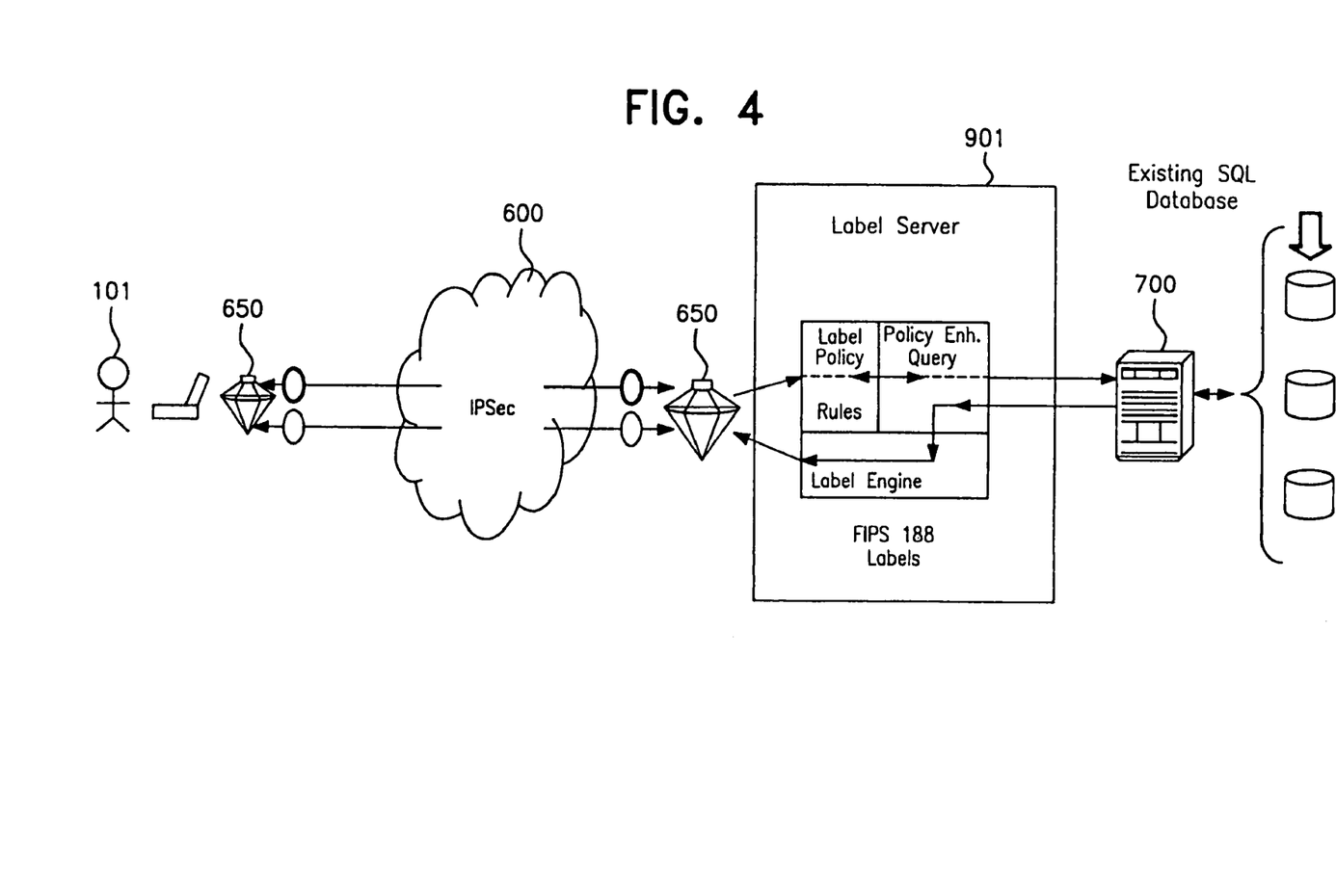
FIG. 4 is a block diagram showing the relationship between the labeling server and other network components in accordance with the present invention.

As shown in FIG. 4, the label server 901 listens to communications traffic on secure networks and adds MAC data to the communications dynamically and invisibly, without application modification. The label server is interposed between the requestor 101 and existing database 700. At least one label processing device, such as TCP/IP communications devices 650, is required to process the labeled result returned from the label server. The label processing device may reside at either or both ends of the communications channel 600.

Figure 5:
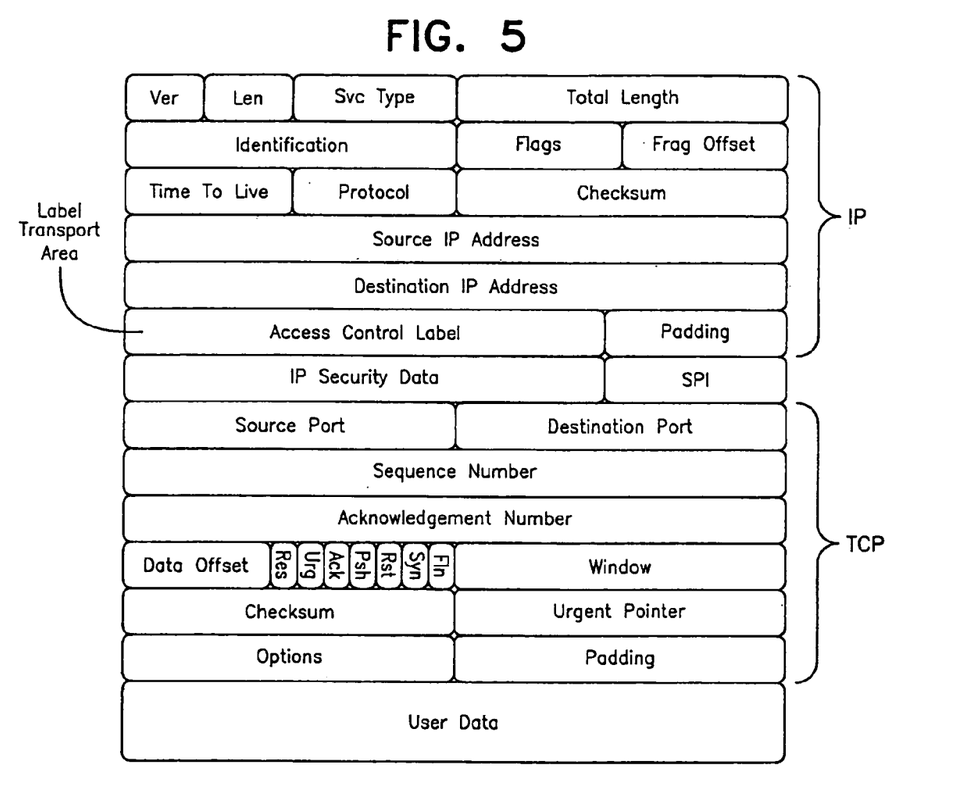
FIG. 5 illustrates the TCP/IP protocol stack carrying the security label.

According to the VDL method, the label server 901 intercepts IP packets over the communications channel 600 and adds label policy to database query requests to generate an enhanced query request. The label server then retrieves the enhanced query results from the database 700, and explicitly writes the IP header option field within the returned packets, applying the policy privileges registered for the requestor to label the result. The label server then sends the result with the label thereon, typically a CIPSO-format label, to the requestor. The VDL on the label server can support all secure network products supporting CIPSO (FIPS 188), as well as other formats, or may be embedded implicitly for customization. FIG. 5 illustrates how the TCP/IP protocol stack carries the security label according to a preferred embodiment.

Figure 6:
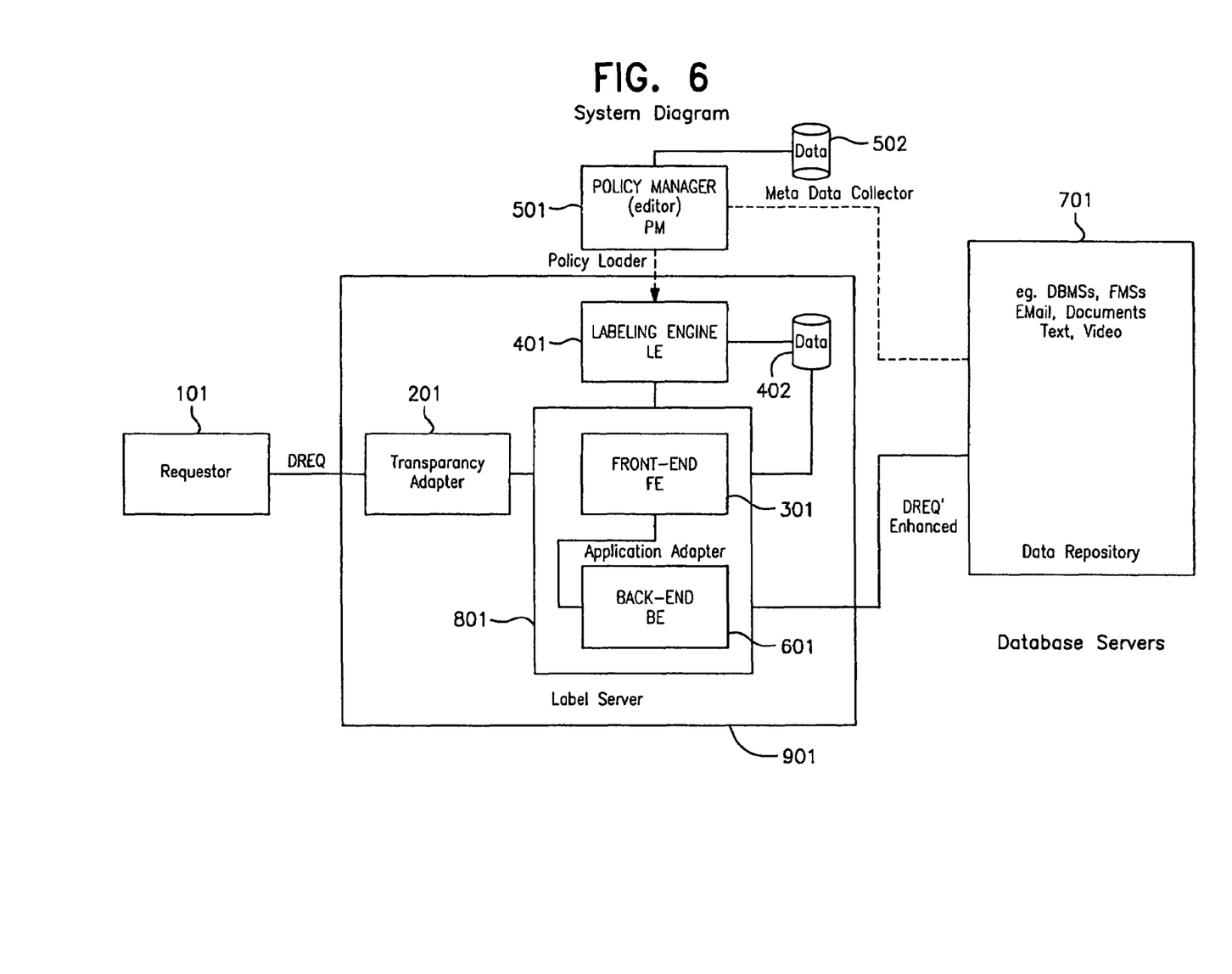
FIG. 6 is a block diagram showing a system level view of the components of the VDL system in accordance with the present invention.

As shown in more detail in FIG. 6, the present invention is directed to a label server (LS) 901 interfacing on the communications channel 600 between a requestor 101 and a data repository 701. The LS 901 software functions may be configured on a single or multiple computing platforms. As shown, the four subsystems of the VDL are the Policy Manager (PM) 501, the Labeling Engine (LE) 401, the Front-End (FE) 301, and the Back-End (BE) 601. The PM 501 has a database 502, and the LE 401 and FE 301 share a FE/LE rules database 402.

The label server 901 is typically interfaced to the requestor 101 through a transparency adapter 201. The transparency adapter 201 acts as a transaction manager, remembering the path in a web-based transaction to maintain session continuity and take data integrity actions.

The Policy Manager (PM) subsystem 501 is housed centrally to support multiple label servers. The PM 501 collects all data needed to identify a transaction and has rules to be applied against the transaction to control and specify retrieval, and support automated labeling. The rules may be managed by the user.

The Labeling Engine (LE) subsystem 401 on the label server allows labels to be applied to data packets for transport on the communications channel based on a set of rules. In a preferred embodiment, the LE subsystem 401 supports labeling the IP header option field of the communications header with a CIPSO label.

The Front-End (FE) subsystem 301 allows a DREQ to be filtered through the LS 901, evaluating each query transaction to map it to labeling rules and adding policy rules to the query. Upon the return of the results, the FE 301 adds criteria for label retrieval and requests header labeling, and thereafter reassembles the payload for the requestor 101. The FE 301 also manages custom labels for interactive transactions.

The Back-End (BE) subsystem 601 reformats the database query content to include attributes set forth in the policy rules to generate an enhanced search query (DREQ'), and records all actions. The BE 601 on the LS 901 calls the database/files, collects and disassembles the returned result for the label attribute value, and forwards the results to the FE 301 for communications header labeling.

The FE 301 and the BE 601 in combination represent an application (data-type) adapter 801. Separate adapters are used for different standard data protocols such as JDBC, ODBC, SMTP. Each adapter represents a separate transaction type. A null data type, i.e., one having no standard interface, is also allowed which permits an application level interface where data policy can be applied by the application's internal functions but is still labeled by the VDL.

The architecture shown in FIG. 6 supports both direct calls to the database and indirect calls to a content data store that is referenced by the database in a conversational transaction. A direct transaction is a unit of work developed from a single screen or a "logical screen" of linked screens requesting processing and access to a database with a returned result. A conversational transaction returns a sequence of results with interactive conversations with a user to further qualify the unit of work, all of which is a single unit of work.

Transaction processing is at the heart of how an organization accomplishes business on today's databases. VDL is designed for data-oriented transactions that apply application logic separate from the data being retrieved from databases or files. VDL is an additive, non-intrusive building block that adds fine-grain data security or filtering to these transactions based upon a pre-stored policy.

Figure 7:
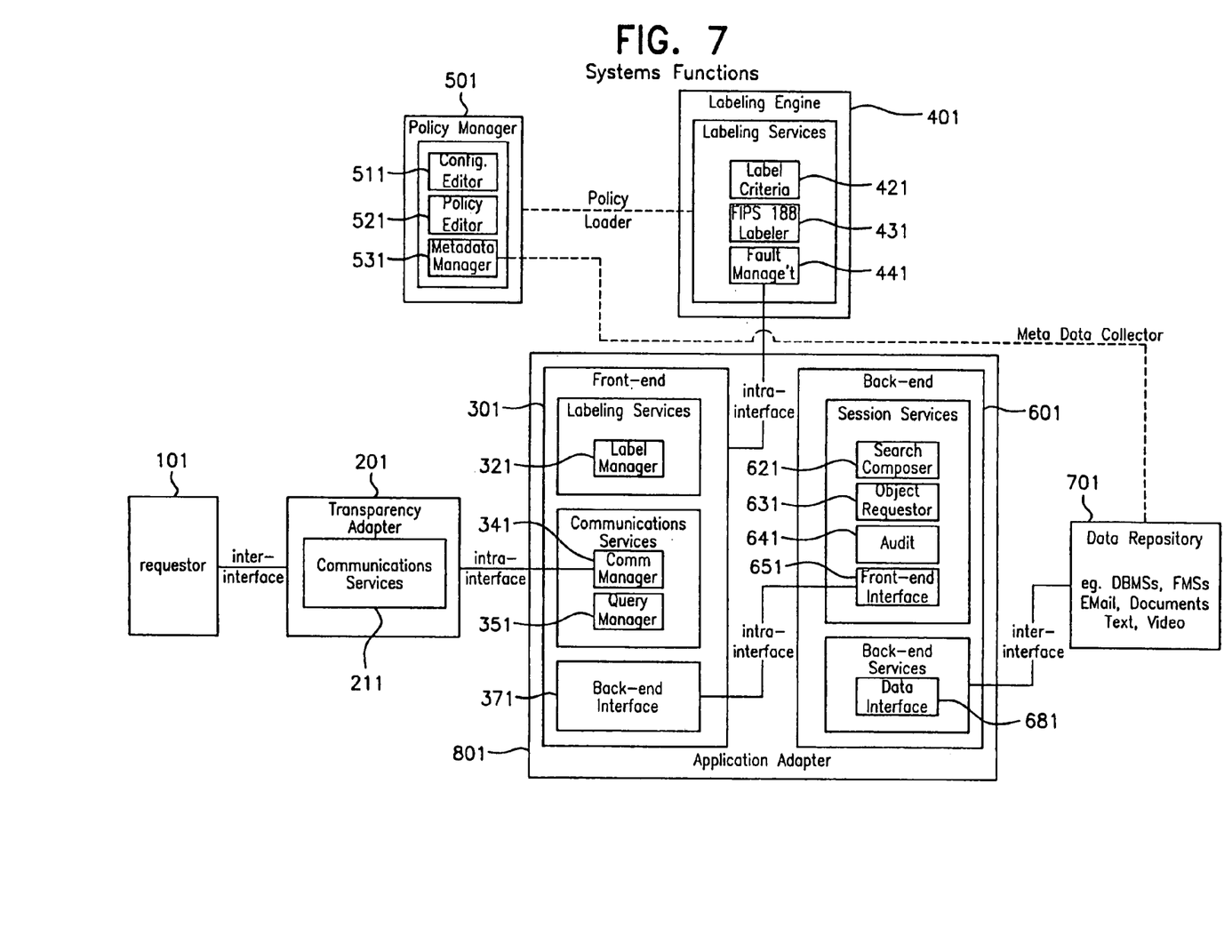
FIG. 7 is a block diagram illustrating the system functions for the VDL components of FIG. 6.

System functions, summarized in FIG. 7, are detailed in the following discussion.

Front-End Subsystem

The FE subsystem 301 filters DREQ from transactions for the retrieval of data from a data repository 701. Communication services 211 on the transparency adapter 201 access the FE 301 through the FE communication manager 341, channeling transaction requests from the requestor 101. The communication services 211 manage control of the session, providing for error handling and maintaining connectivity. The FE query manager 351 recognizes the transaction type of the incoming request as a standard data protocol, and modifies the DREQ to include the attributes or formulas on the attributes set forth in the pre-stored policy held within the PM for that transaction type. The FE 301 can also operate at the application interface level allowing the application to pre-label the data based on the policy. This enables the application to directly or conversationally interface with the data as is common in document management or content (object) based systems.

The FE label manager 321 accepts relevant policy transferred from the Policy Manager (PM) 501 through a "policy rules transfer document". This document contains all valid label search fields (meta-fields) or field values (meta-values) —categories, and their mapping to a transaction-type such as JDBC, SQL*NET or OBD. The FE label manager 321 extracts policy data from the PM policy editor 521 and metadata manager 531, transferring and loading the appropriate policy into the FE/LE rules database 402. Transfers are scheduled in the PM 501 facilities.

The FE query manager 351 identifies metadata or label identifiers based on the transaction-type policy and attaches them to the DREQ as policy tags to generate a "search request document". The policy tags represent specific added data attributes not in the original DREQ. The search request document is forwarded through FE back-end services 371 to the back-end (BE) front-end interface 651. The BE front-end interface 651 has the capability to support different metadata, or the absence of metadata, according to transaction-type policy contained in the FE/LE rules database 402. The BE reformats the search request document to generate an enhanced search request (DREQ').

Once results are returned from the database, the FE back-end services 371 is the interface with the BE front-end interface 651, through which a "search response document" which represents the database or record response (DREP) that is returned based on the DREQ's combined search criteria. The search response document may contain a SQL table or file records, or other data.

The FE label manager 321 accepts disassembled query results from the BE front-end interface 651, and has the capability to add security wrappers, which are specified at the PM policy editor 521 and included in a transaction's policy. These wrappers are client-specific and are passed to the client on all communications channels. The FE label manager 321 will not return the label metadata to the requestor if such return was not part of the original request. Based on the transaction-type, (1) the label attribute of the returned row is forwarded to the LE FIPS 188 labeler 431 for CIPSO (or custom-format) labeling on the IP header's option field (if the DREQ is to be labeled), as shown in FIG. 5; (2) the label attribute field is or is not included in the query payload; and (3) the communication is sent to the requestor 101.

Back-End Subsystem

The BE subsystem 601 receives the search request document including the original payload and modification instructions from the FE back-end services 371. The BE search composer 621 uses this data, retranslating it into the enhanced search request (DREQ') for the search and retrieval of objects in the form of the data type of the adapter 801. In this manner an incoming query intercepted in a particular transport protocol, such as JDBC format as an example, will continue along the communication path in the same format, e.g., JDBC format, when enhanced. Similarly, an incoming query in any other industry standard format will retain that format when enhanced.

The BE data interface 681 is the send/receive interface to the data repository 701. In a preferred embodiment, upon receipt of the returned data (DREP), the BE data interface 681 disassembles the DREP, segmenting the returned rows for labeling. The BE data interface 681 also replaces retrieved values obtained as a result of the DREQ', substituting label tags for the values. These label tags are obtained from the rules database 402 which maintains a mapping of tags to retrievable values.

The BE audit 641 provides a log of all traffic for accounting and problem resolution. This facility may be turned on or off. The BE object requestor 631 enables non-database file locations to be retrieved.

Labeling Engine Subsystem

The LE subsystem 401 is responsible for the labeling of the communications header with the appropriate FIPS 188 label, or other labeling approaches, for transport on the communications channel.

The LE FIPS 188 labeler 431 receives from the FE label manager 321, a request for inserting a FIPS 188 label in the IP header's option field; insertion of a label in the header is called explicit labeling. The LE FIPS 188 labeler 431 evaluates its policy database based on the type of transaction originally identified and determines the appropriate FIPS 188 label-type. The LE FIPS 188 labeler 431 conducts an encoding look-up through LE label criteria 421 for all label categories, mapping FIPS code to the meta-data value or label category of the results returned in response to the DREQ'.

VDL supports full 16-bit labeling, and extends support to 32-bit labeling. In addition, the LE FIPS 188 labeler 431 supports a separate access control mechanism to identify the label and place the label in the payload for non-CIPSO enabled receiving devices; insertion of a label in the payload is called implicit labeling.

The LE fault manager 441 receives all rejected packets from the FIPS 188 device 650 and writes them to a log.

Rejected packets include those in which the packet label did not match the data type specified by the device 650 for that requestor.

Policy Manager Subsystem

The PM subsystem 501 provides a graphical administrator user interface to configure the policy rules database 502 which includes transaction identifiers, FIPS 188 label type, labeling rules, label categories (metadata values) and the mapping of such categories to FIPS 188 encoding. The PM 501 is a separate self-contained subsystem that integrates with an underlying network system controller (NSC) console, such as the Cryptek DiamondCENTRAL NSC console, to enable "category" setting from a single source. Other policy management products may also be used. The PM 501 loads the rules database 402 of the LS 901 with the specific labeling policy rules to be used by that LS 901 in the security augmentation of transaction processing.

Figure 8:
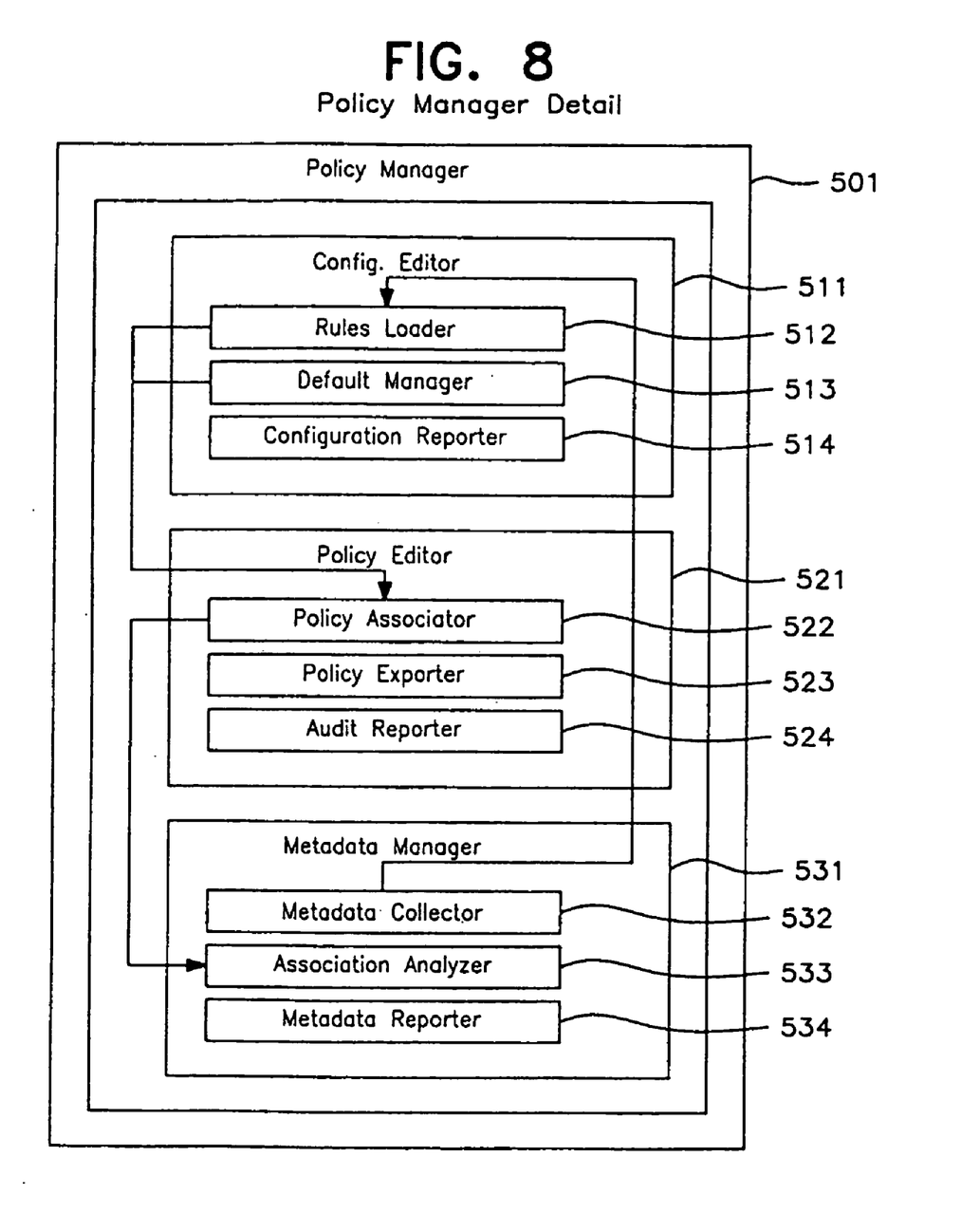
FIG. 8 is a more detailed block diagram of the Policy Manager subsystem of FIG. 7.

As shown in further detail in FIG. 8, the primary components of the PM subsystem 501 are the Configuration Editor 511, the Policy Editor 521 and the Metadata Manager 531.

The Configuration Editor 511 allows the entry, verification and reporting of configuration data, i.e., data categories, contained in the rules database 502. This is accomplished by the Rules Loader 512. The Rules Loader 512 can receive manually input metadata, and may also load pre-stored rules formatted in a Domain of Interpretation (DOI) document format. The DOI format (FIPS 188) allows policy "vocabularies", consisting of label:attribute-set pairs, to be exported and/or imported to various label servers for interoperability between rules databases 402 having different implementations of VDL. The attribute set may be a single attribute, a group of attributes, or an equation on the attribute. In addition, the Rules Loader 512 can receive automatically cataloged metadata through the Metadata Manager 531 using a database scanning utility.

There are two types of rules contained in the rules database 502, namely explicit and implicit. Explicit rules are specific associations between configuration data and labels. For example, data category value "A" is associated with label "X", data category value "B" is associated with label "Z", etc.

Implicit rules are established by the Default Manager 513 and are embodied as a set of default options for data which does not comply with, or find correspondence within, the explicit rules. Such rules provide alternate courses of action, i.e., default options, when, for example, a data category is entered for which there is no associated label. The Default Manager 513 is programmable and is typically be constructed to set forth several optional rule sets, from which the Policy Editor 521 selects. The Configuration Reporter 514 provides the user interface for entry and editing of data to the Configuration Editor 511.

The PM Policy Editor 521 provides the mechanism for defining which labeling rules are to be applied to the data categories identified using the Configuration Editor 511. In other words, the universe of data category values which can be labeled is set-up through the Configuration Editor 511, and the Policy Editor is used to select how these categories will be labeled, i.e., which of the data rules will be used. The Policy Associator 522, preferably using a graphical point and click user interface, associates label values to data content values representing a policy rule as contained in the configuration data. The Policy Exporter 523 exports policy data to the rules database 402 of the LS 901, which uses such policy data in its decision as to how to label every packet moving through the communications channel. The Policy Associator 522 also sets which of the default options, i.e., which of the implicit rules, will be used for evaluating unrecognized information, allowing decisions to be made by the system as to what label or rejection action should be made on unknown content, unused rules, etc. Finally, the Audit Reporter 524 provides the user interface to the audit log which contains information on normal or rejected packets.

The Metadata Manager 531 manages the mapping between content and the rules to be applied for access rights. The Metadata Manager 531 is populated through a Metadata Collector 532 utility that scans existing databases or files using known scanning techniques and captures metadata; metadata can include DB tables, attribute names and attribute values, as well as other data types such as headers, text values and other recognizable content. Once the Metadata Manager 531 has received data, the Association Analyzer 533 analyzes what was done, looking at the associations made by the Policy Associator 522 and providing administrator alerts for unlabeled data and label rules for which there is no data content in the database. The Metadata Reporter 534 provides the user interface for this subsystem.

In use of the present invention, a requestor 101 submits a query (DREQ) to the label server 901. The PM 501 collects the data needed to identify the query as a transaction, and determines the rules to be applied against the transaction from the database 502. The FE 301 evaluates the query, mapping the query to labeling rules downloaded to the FE/LE label policy rules database 402 from the policy rules database 502, and then forwards the substance of the query or payload and the relevant rules to the BE 601. The BE reformats the query and rules to build a modified query (DREQ') and calls the data repository 701 for the appropriate objects/files. The data repository 701 returns the data/objects to the BE 601 which then disassembles the returned result for the label attribute value and forwards the results to the FE 301 for communication channel labeling. The FE 301 requests header labeling from the LE 401 and then reassembles the payload for transmission to the requestor. A label processor is thereafter used to discriminate allowable traffic for that requestor on the basis of the virtual labels. The label processor may be embodied as the Cryptek DiamondLink product, or any other suitable product having CIPSO (FIPS 188) labeling format capability.

The foregoing descriptions and drawings should be considered as illustrative only of the principles of the invention. The invention may be implemented in a variety of configurations and is not limited to the specific configuration of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

We claim:

1. A virtual data labeling system for dynamically labeling data received over an Internet communications network in response to a database call, said network including a database external to a database management system, comprising:
   means for listening to Internet Protocol (IP) communications traffic;
   means for mapping labeling rules to a search request to the database from a requestor;
   means for retrieving data from the database in accordance with the labeling rules and the search request;
   means for labeling the retrieved data; and
   means for forwarding the labeled retrieved data to the requestor over the Internet communications channel.

2. The virtual data labeling system as set forth in claim 1, further comprising means for discriminating said labeled retrieved data such that said requestor is able to access only that portion of said labeled retrieved data having a label corresponding to an access privilege of said requestor.

3. The virtual data labeling system as set forth in claim 2, wherein said labeling means labels said retrieved data with a FIPS 188 label and said means for discriminating is a FIPS 188 label processor.

4. The virtual data labeling system as set forth in claim 1, wherein said mapping means comprises:
   a front-end subsystem for receiving the search request from the requestor; and
   a policy manager subsystem coupled to said front-end subsystem for storing policy rules and providing said policy rules to said front-end subsystem, said front-end subsystem receiving the policy rules from the policy manager subsystem and generating a modified search request.

5. The virtual data labeling system as set forth in claim 4, wherein said retrieving means comprises:
   a back-end subsystem interposed between the front end subsystem and the database for reformatting the modified search request to generate an enhanced search request, said back-end subsystem forwarding the enhanced search request to the database and receiving the requested data as retrieved data, said back-end subsystem forwarding said retrieved data to said front-end subsystem.

6. The virtual data labeling system as set forth in claim 4, wherein said labeling means labels a communication header of said retrieved data, and said forwarding means is embodied as said front-end subsystem.

7. A label server system including a plurality of subsystems on an Internet communications channel between a client server and a data repository, said label server system cooperating with a label processor for discriminating communications channel traffic, said label server system comprising:
   a front-end subsystem for receiving a search request from a requestor at the client server;
   a policy manager subsystem coupled to said front-end subsystem for storing policy rules and providing said policy rules to said front-end subsystem, said front-end subsystem receiving the policy rules from the policy manager subsystem and generating a modified search request;
   a back-end subsystem interposed between the front end subsystem and the data repository for reformatting the modified search request to generate an enhanced search request, said back-end subsystem receiving the requested data from said data repository as retrieved data, said back-end subsystem forwarding said retrieved data to said front-end subsystem; and
   a labeling engine subsystem, coupled to said front-end subsystem, for labeling a communication header of said retrieved data;
   said front-end subsystem transferring the labeled retrieved data through said label processor to the requestor.

8. The label server system as set forth in claim 7, said label processor including a FIPS 188 label processor for discriminating traffic on said Internet communications channel using said labeled communication header.

9. The label server system as set forth in claim 7, said policy manager subsystem comprising:
   a configuration editor allowing entry, verification and reporting of data categories which define configuration data;
   a policy manager database for storing said configuration data and a plurality of rules;
   a policy editor, coupled to said configuration editor, for determining which of said plurality of rules are to be applied to the data categories; and
   a metadata manager, coupled to said configuration editor and to said policy editor, for mapping content data to said rules determined by said policy editor.

10. A method for dynamically labeling a communication channel comprising the steps of:
    listening to Internet Protocol (IP) communications traffic;
    receiving a query request from a database caller;
    mapping labeling rules to said query request to generate an enhanced query request;
    retrieving data from a database in accordance with said enhanced query request;
    labeling the retrieved data in accordance with said labeling rules;
    forwarding the labeled retrieved data to the database caller.

11. The method as set forth in claim 10, further comprising before the step of listening the step of inputting a plurality of metadata defining data categories and rules into a policy manager, said step of mapping including determining by said policy manager which of said plurality of metadata to apply to said query request.

12. The method as set forth in claim 10, further comprising the step of discriminating said labeled retrieved data such that said database caller is able to access only that portion of said labeled retrieved data having a label corresponding to an access privilege of said requestor.

13. A method of enforcing data access privileges on data received from a remote data repository over a communications channel using a label server and a policy manager, comprising the steps of:
    filtering, using a front-end subsystem of said label server, a database request from a requestor for retrieval of data from the data repository;
    receiving, by said front-end subsystem, a policy rules transfer document from said policy manager;
    modifying, by the front-end subsystem, the database request to include attributes set forth in the policy rules transfer document;
    forwarding said database request to a back-end subsystem of said label server;
    reformatting, by said back-end subsystem, said database request with said attributes to generate an enhanced search request;
    retrieving, by said back-end subsystem, a search response document from said data repository in accordance with said enhanced search request;
    forwarding said search response document to said front-end subsystem;
    labeling, by a labeling engine coupled to said front-end subsystem, a communication header of said search response document with a label; and
    forwarding the labeled search response document to the requestor.

14. The method as set forth in claim 13, further comprising the step of discriminating a plurality of labeled search response documents such that said requestor is able to access only those labeled search response documents having a label corresponding to an access privilege of said requestor.

15. The method as set forth in claim 13, further comprising the step of:
    adding a security wrapper to said search response document by said front-end subsystem.

\* \* \* \* \*